United States Patent [19]

Oliver

[11] Patent Number: 5,677,947
[45] Date of Patent: Oct. 14, 1997

[54] APPARATUS AND METHOD FOR OPERATING A TELEPHONE LINE TELEMETRY DEVICE IN A MULTIPLE HOST ENVIRONMENT

[75] Inventor: Stewart Warner Oliver, Venice, Calif.

[73] Assignee: International Teldata Corporation, Chicago, Ill.

[21] Appl. No.: 519,526

[22] Filed: Aug. 25, 1995

[51] Int. Cl.$^6$ .................................. H04M 11/00
[52] U.S. Cl. ........................... 379/107; 340/870.02
[58] Field of Search ..................... 379/106, 107, 379/90, 93, 97, 98; 340/870.01, 870.02

[56] References Cited

U.S. PATENT DOCUMENTS

| | | |
|---|---|---|
| 4,180,709 | 12/1979 | Cosgrove et al. . |
| 4,489,220 | 12/1984 | Oliver . |
| 4,540,849 | 9/1985 | Oliver . |
| 4,578,536 | 3/1986 | Oliver et al. . |
| 4,646,342 | 2/1987 | Hargrave et al. .......... 379/106 |
| 4,654,869 | 3/1987 | Smith et al. .............. 379/107 |
| 4,710,919 | 12/1987 | Oliver et al. . |
| 4,833,618 | 5/1989 | Verma et al. . |
| 4,839,917 | 6/1989 | Oliver . |
| 4,866,761 | 9/1989 | Thornborough et al. . |
| 5,134,650 | 7/1992 | Blackmon . |
| 5,189,694 | 2/1993 | Garland . |
| 5,202,916 | 4/1993 | Oliver . |
| 5,204,896 | 4/1993 | Oliver . |
| 5,234,644 | 8/1993 | Garland et al. . |
| 5,235,634 | 8/1993 | Oliver . |
| 5,434,911 | 7/1995 | Gray et al. .............. 379/107 |
| 5,454,031 | 9/1995 | Gray et al. .............. 379/106 |
| 5,485,509 | 1/1996 | Oliver . |
| 5,488,654 | 1/1996 | Oliver . |

OTHER PUBLICATIONS

"Outline Specification For A Meter Interface Unit for use with PSTN No Ring Calls" by K.E. Nolde, BT Laboratories May 8, 1993.

*Primary Examiner*—Wing F. Chan
*Attorney, Agent, or Firm*—Fitch, Even, Tabin & Flannery

[57] ABSTRACT

A telemetry device is provided which communicates over a phone line with one of a plurality of host stations. The telemetry device includes a plurality of meter ports and a memory for storing host attribute information for the plurality of host stations. In one embodiment, the host attribute information stored in memory includes a table of host call-in times for the respective host stations and further includes respective telephone numbers for those host stations. The telemetry device determines when the call-in time of a particular host station has been reached. More particularly, when the call-in time of a particular host station has been reached, the telemetry device initiates a call to the host station over the phone line and establishes a connection therewith. A telemetry transaction then ensues between the particular host station and the telemetry device. The particular host station transmits command codes to the telemetry device to cause the telemetry device to read consumption information from a particular meter port. The consumption information is then transmitted over the phone line to the host station for further processing.

36 Claims, 5 Drawing Sheets

APPARATUS AND METHOD FOR OPERATING A TELEPHONE LINE TELEMETRY DEVICE IN A MULTIPLE HOST ENVIRONMENT

CROSS REFERENCE TO RELATED PATENT APPLICATIONS

This patent application relates to my copending patent application entitled "APPARATUS AND METHOD FOR ON-DEMAND ACTIVATION OF TELEPHONE LINE TELEMETRY DEVICES", Ser. No. 08/519,826 filed concurrently herewith and assigned to the same assignee, the disclosure of which is incorporated herein by reference.

BACKGROUND OF THE INVENTION

This invention relates in general to data collection systems which use remotely located telemetry devices to transfer telemetry data from a remote site to a central processing location. More specifically, the invention relates to automatic meter reading (AMR) systems which use conventional subscriber telephone lines to transfer telemetry data, in the form of utility meter readings, from a customer's premises to a central processing location.

Prior to the existence of automatic meter reading (AMR) systems, the most common method for determining the amount of commodity delivered to a utility customer was to manually read a meter at, or in close proximity to, the consumer premises. Because the utility meters were located at the point where the utility commodity was dispensed to the customer, it became necessary for utility companies to establish routes where a "meter-reader" periodically visited each meter on the route to record the amount of utility product consumed.

At present, many utilities, including gas, electric and water companies, continue to send meter readers to consumer residences to collect utility meter readings. However, there are practical limitations as to how often and how efficiently this procedure can be manually performed. For instance, weather and the ability to gain access to meters themselves (which are often inside the consumer's residence) directly impact the efficiency of this manual procedure. Today, where it is desirable for the utility to have almost instantaneous access to any meter, the manual method for collecting these readings is becoming both economically and operationally obsolete in favor of the more reliable automatic techniques now available.

One very practical methodology for automating the process of collecting utility meter readings utilizes the existing telephone system, thereby taking advantage of the already widespread availability of telephone service to both residential and business premises. Using the existing infrastructure, remotely located telemetry devices (at each consumer's premises) electronically upload utility meter readings as telemetry data to a central processing location via the subscriber telephone lines. This process is analogous to the procedure used by many PC users to electronically upload files by the use of a modem connected to the subscriber telephone line, except that the AMR procedure is fully automatic. This invention relates to those AMR systems which utilize telephone line telemetry techniques.

Figure 1A:
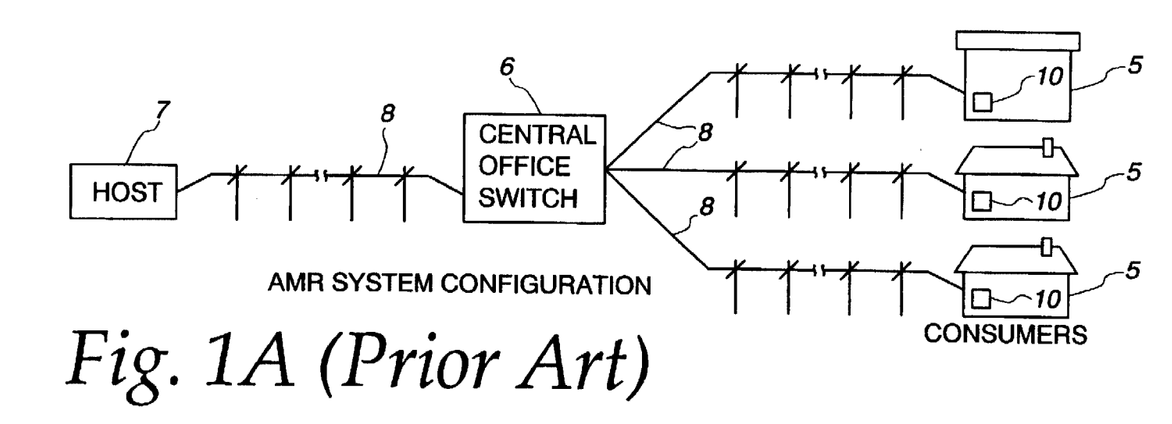
FIG. 1A is a block diagram of a conventional AMR system.
Figure 1B:
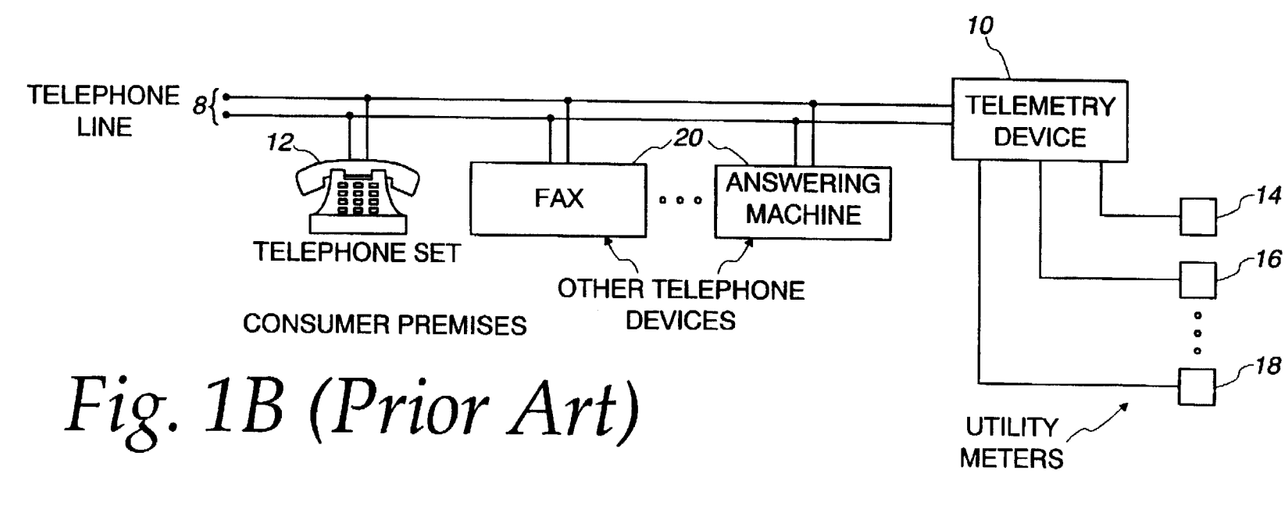
FIG. 1B is a block diagram of conventional telephone device equipment including an MIU telemetry device located at the utility consumer's premises.

A typical AMR system configuration is shown in FIG. 1A where a utility company utilizes a single host computer system 7 to collect data from a plurality of consumers 5 (homes, apartments, businesses, etc.) over the existing telephone system. At each consumption point, a telephone line telemetry device 10 is connected to one or more utility meters 14, 16, 18 as shown in FIG. 1B. This coupling arrangement makes the utility meters electronically accessible to host computer system 7 via the existing public telephone network infrastructure including central office switch 6. The design of telemetry device 10 is such that it operates over the same telephone line 8 as the subscriber's telephone set 12 so there is no need for additional phone lines or infrastructure.

In AMR applications, telemetry device 10 is called a meter interface unit (MIU) or telemetry interface unit (TIU), since the device serves as an interface between two different electrical environments. One side of the MIU telemetry device, called the meter side, is connected to one or more utility meters 14, 16, 18 while the remaining side of the MIU is connected in parallel across the subscriber telephone line. With regard to the telephone line side of the MIU telemetry device, the connection is electrically equivalent the to homeowner plugging in an additional telephone 12 or answering machine 20 and the telemetry device appears in parallel with the other telephone devices connected to the phone line. Other than connecting the MIU to the subscriber line, no modification of the existing telephone line wiring is required.

In one particular type of AMR system, known as a "dial-inbound system", the telemetry device incorporates a real time clock thereby enabling it to call into a host processing center at a prearranged date and time. By electronically interrogating the utility meter attached to it, the MIU telemetry device uploads the amount of metered commodity delivered to the consumer's premises. In return, it receives telemetry data from the host computer system which includes its next appointment time and date. At the conclusion of the telemetry exchange, the MIU "hangs up," placing it back into an on-hook quiescent mode wherein it waits for the next scheduled appointment. An MIU telemetry device suitable for use in a dial-inbound system is described in my patent entitled "Apparatus and Method for Activating an Inbound Telemetry Device", U.S. Pat. No 5,235,634, the disclosure of which is incorporated herein by reference.

The dial-inbound MIU telemetry device can be considered a "smart" telephone in that it automatically determines when the phone line is available for use, takes itself offhook, dials a preprogrammed telephone number, communicates over the phone line, and then hangs up. Like the subscriber, the dial-inbound telemetry device must know the telephone number to call and, in addition, also requires an appointment time. Since these parameters cannot be known in advance by the manufacturer of a telemetry device, they are programmable attributes which are initialized (i.e. set by the installer) when the MIU is first placed into service in the target AMR system.

Unquestionably, the industry preferred method for designing an MIU involves the use of a microprocessor to "intelligently" manage the multitude of tasks which the MIU must perform. The sequence of tasks and the method for performing them is coded as a computer program by a software designer. The finished program, called firmware, is then stored as a machine readable object code in a ROM (read only memory) and becomes an executable program for the MIU's microprocessor. Thus, the firmware puts the operation of the MIU under the program control of a microprocessor or microcomputer.

While the structure of such conventional MIU telemetry devices including firmware is substantially the same from one user's premises to another, certain software variables remain application specific for each user's MIU device. As previously described, the two most prominent parameters for a dial-inbound telemetry device, namely its appointment time and a target telephone number (for the host), are software variables which are individually set (or subsequently changed under program control) for each user's dial-inbound telemetry device. Since these parameters need to be retained even if power to the telemetry device is interrupted, they are stored in non-volatile memory, typically in an EEROM (electrically erasable ROM) which may be either a discrete memory component or part of the on-chip memory of a microcontroller.

Consequently, to configure a generic MIU telemetry device for operation in a particular AMR system, configuration data is programmed into its non-volatile memory. The stored data determines which of the MIU's resident software features are enabled and initializes the values for certain software variables, such as the appointment time and target telephone number. Consequently, the process of setting these software parameters is referred to as "personality programming" of the MIU, since the procedure imbues the MIU with an electronic personality compatible with the target AMR system.

Recalling that the dial-inbound MIU telemetry device 10 depicted in FIG. 1B can be connected to a plurality of utility meters 14, 16 and 18, the operation of the telemetry device in a multiple meter configuration remains, essentially, unchanged. In this case, the telemetry device dials into its designated host at the appointed time, but instead of electrically interrogating one utility meter, as before, it interrogates all of the utility meters connected to it, and uploads all the meter readings as telemetry data. Thus, for one type of conventional dial-inbound MIU, multiple meter operation is merely the concatenation of a plurality of individual meter readings under the auspices of one telemetry session.

From the above discussion, it should be appreciated that both single and multiple meter reading methodologies are single host architectures. Since conventional MIU/host systems are typified by telemetry devices which upload telemetry data to a single processing center or host, conventional MIU telemetry devices are classified as single host operation devices. Similarly, consistent with communicating with only a single host, the two essential dial-inbound parameters for an MIU telemetry device, namely its appointment time and its target telephone number, remain unchanged in either single meter or multiple meter configurations. Consequently, the above-described conventional dial-inbound telemetry devices are inherently single host telemetry devices.

While some conventional single host telemetry devices can be programmed with more than one telephone number, these devices remain essentially single host telemetry devices. For instance, one MIU telemetry device will call a secondary number if the MIU determines that it cannot successfully contact the host after dialing a first primary number. Recalling that one of the dial-inbound attributes, namely the appointment time, remains unchanged, the secondary number serves to provide the MIU with a "backup" telephone number, as an alternative. While this is a worthwhile feature for the telemetry device to have, it still remains a single host device by virtue that it primarily communicates with a single host. One telemetry device that employs such a "backup" telephone number feature is the Model IE-4 MIU, manufactured by International Teldata, Los Angeles, Calif., which offers the feature as an option.

It is thus appreciated that a fundamental limitation of the conventional dial-inbound telemetry device is that such a device cannot independently call into and conduct telemetry transactions with more than one host.

SUMMARY OF THE INVENTION

Accordingly, one object of the present invention is to provide a telemetry device with a capability of functioning in a multiple host environment.

Another object of the present invention is to provide a telemetry device which is capable of determining which one of a plurality of host stations to call to engage in a telemetry transaction therewith.

Another object of the invention is to provide a dial-inbound telemetry device with a capability of dialing into different hosts.

Yet another object of the present invention is to provide a dial-inbound telemetry device capable of retaining the dial-inbound attributes for a plurality of hosts.

Also, another object of invention is to provide an MIU telemetry device which has dial-inbound attributes, including an appointment time and telephone number, programmably associable with a plurality of hosts.

In accordance with one embodiment of the present invention, a telemetry device is provided for collecting information at a remote location and for transmitting the information over a phone line to one of a plurality of host stations. The telemetry device includes at least one meter port for receiving information. The telemetry device also includes a memory for storing respective host attributes for each of the plurality of host stations. The telemetry device further includes a processor, coupled to the memory and at least one meter port, for accessing the host attributes in the memory to determine which host station of the plurality of host stations to call over the phone line to report information from the at least one meter port.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 2A:
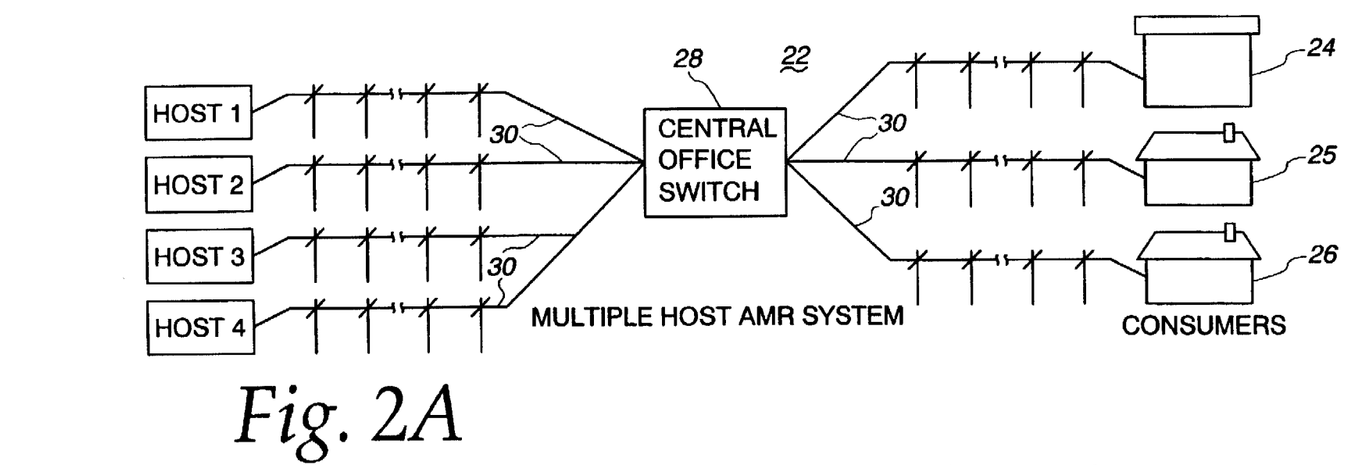
FIG. 2A is a block diagram of the disclosed multiple host AMR system.

FIG. 2A shows a multiple host dial-inbound AMR system 22. The system is configured such that a plurality of consumers 24, 25 and 26 are each connected to the central office switch 28 via conventional subscriber telephone lines 30. As the term multiple host suggests, also connected to central office switch 28 via conventional dial-up telephone lines 30 are one or more hosts, namely host 1, host 2, host 3 and host 4 respectively. In keeping with the operation of a dial-inbound system, telemetry devices located at the consumer premises will dial into a host at an appointed time and date so as to exchange telemetry data with the host.

Figure 2B:
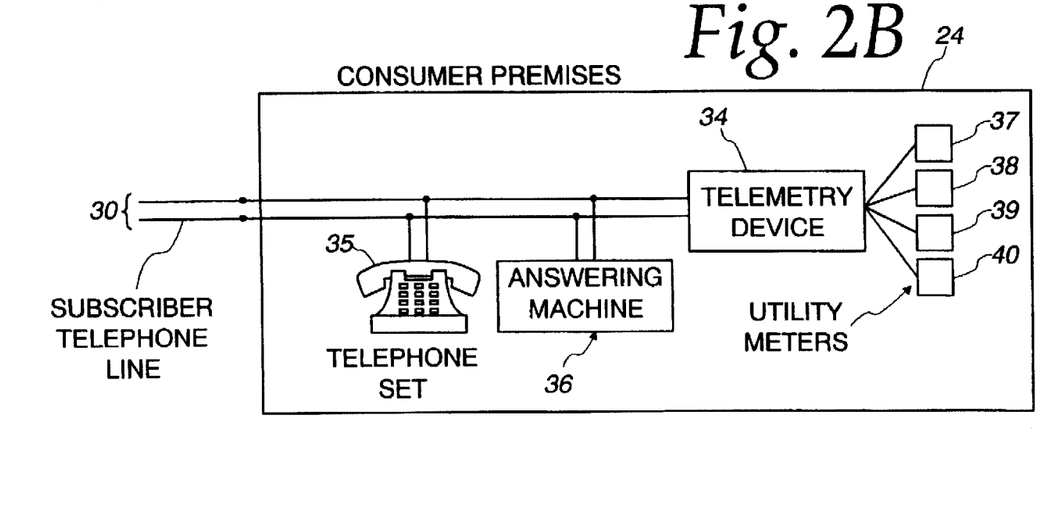
FIG. 2B is a block diagram of equipment at the consumer's premises including the disclosed multiple host telemetry device.

As shown in FIG. 2B, at a consumer residence 24 a multiple host telemetry device 34 (or MIU) is connected to the subscriber telephone line 30. The design of this MIU (meter interface unit) telemetry device 34 is such that it can share the telephone line with other telephone devices which the subscriber might connect to the line, such as a subscriber telephone set 35, an answering machine 36 or a FAX (facsimile) machine, a computer modem, etc. Alternatively, the telephone line can also be dedicated to serving only MIU telemetry device 34, if desired. Connected to the MIU telemetry device are one or more utility meters 37, 38, 39 and 40 which can be electrically interrogated to ascertain the value of consumed commodity shown on the face of the meter (called the meter register). Unlike conventional dial-inbound telemetry devices, the novel design of the multiple host MIU telemetry device 34 allows it to retain the dial-inbound attributes for a plurality of hosts. This innovation enables the MIU to communicate with a plurality of hosts, each host independently having its own appointment time and telephone number.

In the particular implementation shown in FIG. 2B, the multiple host MIU telemetry device 34 is connected to four utility meters, namely a gas meter 37, a water meter 38, an electric meter 39, and another meter 40 as desired for a particular application. Accordingly, each utility company has a host computer system (host station) dedicated to collecting the amount of commodity consumed at their metering point. That is, there are four hosts, namely hosts 1, 2, 3 and 4 each dedicated to reading their particular utility meter. Thus, hosts stations 1, 2, 3 and 4 of FIG. 2A would correspond to a gas company host station, a water company host station, an electric company host station, and another host station, respectively.

In keeping with its multiple host capability, MIU telemetry device 34 independently retains the reporting schedule for each host station's utility meter. Thus, at a first appointment time (call-in time), the dial-inbound MIU telemetry device 34 will be activated to call, for example, the gas company host (host 1) to report the amount of gas commodity delivered to a customer premises. Similarly, at a second appointment time, MIU 34 will again be activated to call the water company host (host 2) to report the reading of the water meter. At a third appointment time, the MIU would call into the electric company host (host 3) to report the electric meter reading. And finally, at a fourth appointment time, the MIU would call into host 4 to provide a respective consumption information reading thereto. As just demonstrated, the novel structure of this dial-inbound MIU enables it to communicate with a plurality of independent hosts (i.e. host stations). By contrast, a conventional system would require four single host MIU telemetry devices (each connected to one utility meter and each dedicated to calling only one host) to collect consumption information from the four utility meters. Therefore, one multiple host MIU can replace a plurality of conventional single host MIUs and, in these applications, is a significantly more economical solution.

Figure 3:
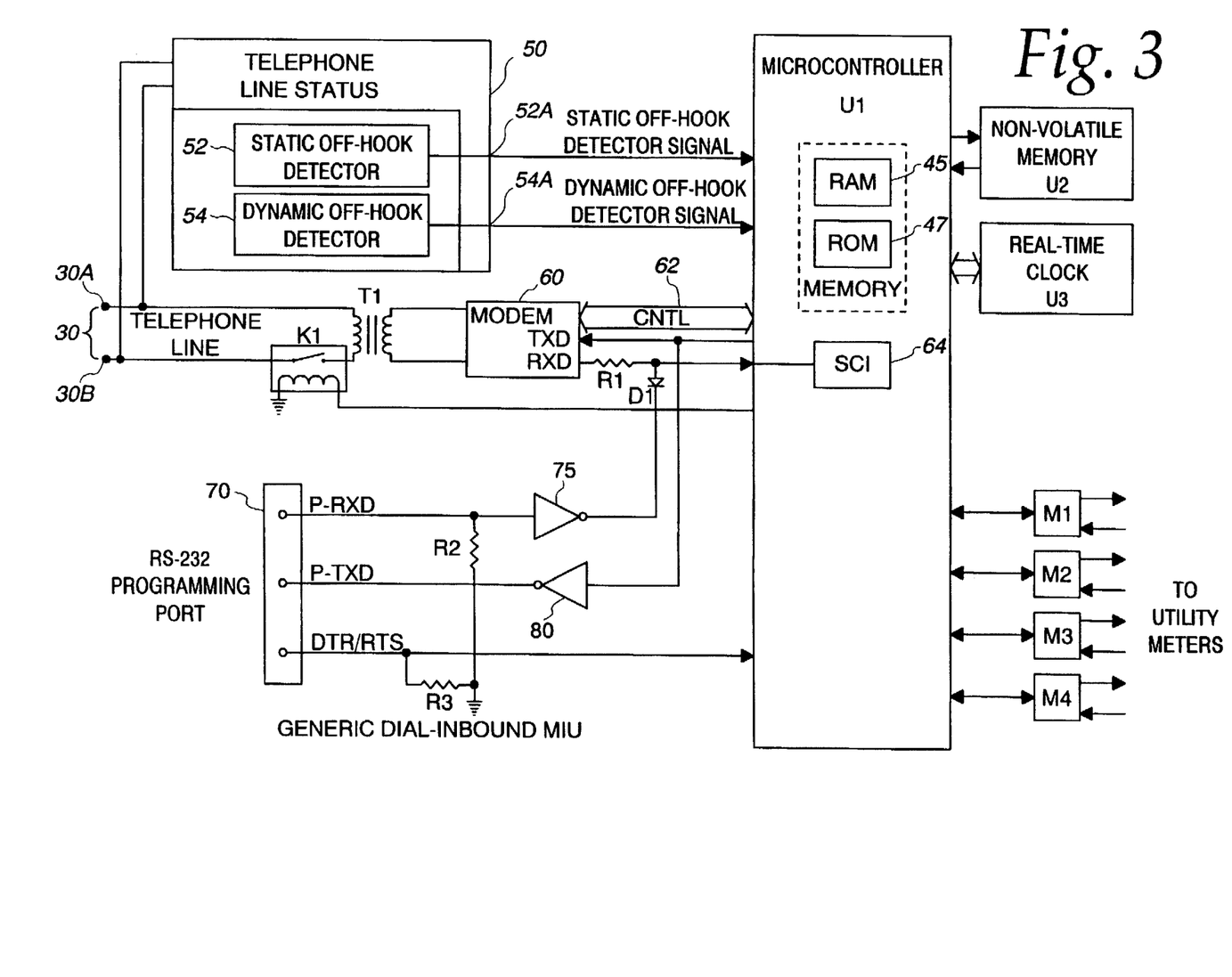
FIG. 3 is a simplified schematic diagram of the disclosed multiple host MIU telemetry device.

FIG. 3 shows a simplified schematic of a dial-inbound MIU telemetry device 34 incorporating the preferred embodiment of the invention. In MIU telemetry device 34, the entire operation of the telemetry device is under the program control of a microcontroller or microprocessor. Therefore, the operational characteristics of the MIU are determined by a software program being executed by the resident microcontroller as will be described in more detail subsequently. Telemetry device 34 includes input terminals 30A and 30B which are telephone line input terminals that are coupled to phone line 30.

As shown in FIG. 3, MIU 34 includes a microcontroller U1 connected to one or more meter interface ports M1–M4. These meter interface ports are connected to electrically encoded registers on the utility meters (not shown) and can be interrogated by microcontroller U1 using a predetermined serial protocol. In this manner, microcontroller U1 can read the value shown on the face of the utility meter. This value will be uploaded to the host computer system as telemetry data. The electrically encoded meter register could be, for example, a Kent model C700 water meter with encoded register or a Landis & Gyr model DEMS electric meter. A variety of other electrically readable utility meters are also commercially available and can be interfaced to microcontroller U1 by those skilled in the art.

Microcontroller U1 actually includes a microprocessor core and digital memory in the form of a RAM 45 (random access memory) and ROM 47 (read only memory). The ROM contains the firmware for the telemetry device and puts the entire operation of the MIU under the program control of the microcontroller. While the ROM memory can be read but not altered, RAM memory can be changed under program control and is used to store program variables, or other temporary data which the program might need for later use. In practice, this microcontroller is usually a single chip semiconductor device such as the Motorola M68HC05 which contains on-board ROM and RAM.

For a multiple host dial-inbound telemetry device, certain variables such as the multiple telephone numbers and appointment times, in addition to device configuration data, are initially programmed into the MIU and are permanently retained, even if power to the MIU is momentarily interrupted. To accomplish this, an EEROM (electrically erasable ROM) U2 is connected to microcontroller U1 to serve as a nonvolatile memory for the MIU. In one embodiment, EEROM U2 is a model XL93C46 EEROM manufactured by Exel. Alternatively, certain microcontrollers such as the Motorola HC11 series of microcontrollers also contain on-chip EEROM memory which could provide the same functionality as the discrete nonvolatile memory U2, if desired.

A real time clock U3 is also connected to microcontroller U1 of dial-inbound telemetry device 34 of FIG. 3. This clock is programmed with an alarm time and date so as to activate the dial-inbound MIU to call into a host at a designated time. The microcontroller U1 can configure the real time clock under program control and can set both the current time and the alarm time. The microcontroller can also read the current time kept by the real time clock. A single chip commercially available component which is well suited to this task and which can be readily interfaced to a microcontroller by those skilled in the art is the Ricoh RP5C15.

To monitor the status of the subscriber telephone line, a telephone line status indicator 50 is also connected to microcontroller U1. Through this complex device, microcontroller U1 is kept informed of the current status of the phone line. The components contained in line status indicator 50 are a static off-hook detector 52 and a dynamic off-hook detector 54.

Static off-hook detector 52 prevents telemetry device 34 from attempting to seize telephone line 30 if phone line 30 is already in use, thereby preventing it from possibly interfering with an in-progress telephone call. More particularly, static off-hook detector 52 provides a static off-hook detector signal at output 52A which instructs microcontroller U1 not to seize the phone line (go off-hook) when phone line 30 is already in use. One static off-hook detector which is suitable for use as static off-hook detector 52 is described in my patent "Signal Processing Circuit for use in Telemetry Devices", U.S. Pat. No 5,202,916, the disclosure of which is incorporated herein by reference.

Assuming that telemetry device 34 is already off-hook, then dynamic off-hook detector 54 is used to immediately hang-up telemetry device 34 in the event that a user telephone, or other telephone device, coincidentally comes off-hook thereby interrupting an on-going telemetry session. More particularly, dynamic off-hook detector 54 provides a dynamic off-hook detector signal at output 54A which informs microcontroller U1 when a user telephone or other telephone devices comes off-hook while the telemetry device is carrying on a telemetry exchange with the host. When this occurs, microcontroller U1 causes telemetry device 34 to immediately hang-up and relinquish the phone line by opening relay K1. Dynamic off-hook detectors which are suitable for use as dynamic off-hook detector 54 are described in my patent "Outbound Telemetry Device", U.S. Pat. No. 5,204,896 and in my patent applications "Telemetry Device Including a Dynamic Off-Hook Detector" (Ser. No. 08/128,865) and "Telemetry Device Including a Dynamic Off-Hook Detector Capable of Operating in a Pulse-Dialing Environment" (Ser. No. 08/128,864), the disclosures of each of which are incorporated herein by reference.

Also connected to the microcontroller U1 is a modem 60 which is connected to phone line 30 via hybrid transformer T1. When relay K1 is closed under the program control of microcontroller U1, telemetry device 34 can seize the telephone line and draw loop current (approximately 50 mA) from the central office switch. With relay K1 energized, hybrid transformer T1 appears as a 600 ohm load required to properly terminate the off-hook telephone line. When the telemetry device is pulling loop current, the central office switch knows that a telephone device is off-hook and will initially provide dial tone to the off-hook telephone device. To facilitate the dialing of a telephone number, modem 60 includes a DTMF (dual tone multifrequency) dialer which is under the program control of microcontroller U1, thereby enabling the telemetry device to call into a host system. A variety of commercial manufacturers sell modems which can be used for this application. For instance, the entire modem could be a single chip integrated circuit such as the SC11016 "300/1200 bit per second modem" with DTMF dialer manufactured by Sierra Semiconductor, if desired.

Microcontroller U1 configures the operation of modem 60 by sending instructions to set the baud rate and other communication parameters via control lines 62 (CNTL) thereby preparing it for a telemetry transaction. Once connected to a remote host, data sent from the host to the MIU telemetry device 34 appears on the receive data (RXD) output of modem 60 while data to be sent from the MIU to the host is placed on the transmit data (TXD) input of the modem 60 by microcontroller U1. Since both transmit and receive data is accessible to microcontroller U1, the telemetry device is capable of sending data to and receiving data from a host. Thus, modem 60 is a hardware peripheral to the microcontroller which interfaces the telemetry device to and facilitates the transport of telemetry data over telephone line 30.

Since computers work with binary words of information while modem communications are inherently serial, an asynchronous communications protocol is used to send binary words in a serial format. In this format, an 8 bit digital word (i.e. a byte) is first serialized and then preceded by a start bit and followed by a stop bit before being transmitted. These extra bits act as place holders and allow modem 60 to serially transfer 8 bits of data at a time (i.e. one binary word) with an arbitrary pause between transfers of binary words, since computers such as microcontroller U1 only communicate in multiples of whole binary words. A device which automatically handles this protocol is called a UART (universal asynchronous receiver-transmitter) and is commercially available from a variety of semiconductor manufacturers. Such a UART can be used to take the serial output of a modem, such as 60, and present an 8 bit word (a byte) to a device, such as a microcontroller U1. (For an excellent treatise on asynchronous communication the reader is referred to "Technical Aspects of Data Communications", by John E. McNamara, Digital Press, 1977, LCCC number 77-93590.)

Asynchronous communcation being ver common, some microcontrollers, such as the Motorola M68HC05, incorporate into their design an SCI (serial communications interface) which is programmable UART. As shown in FIG. 3, microcontroller U1 includes an SCI 64 which is directly coupled to the output of the modem 60. SCI 64 is capable of generating an internal interrupt to the microcontroller each time a binary word is received from a particular host station. The microcontroller can then check the contents of its UART register (not shown) to determine when a character has been received from a host station.

Resistor R1 and diode D1 serve to isolate modem 60 from microcontroller U1 and allow an RS-232-C programming terminal (not shown) to be connected to MIU telemetry device 34 via programming port 70. The configuration or set-up of an MIU 34 for operation in a target AMR system is accomplished by the initial programming of certain software variables, including respective dial-inbound attributes (such as call-in times and host telephone numbers) to be logically associated with each of a plurality host stations. Normally the terminals P-RXD, P-TXD and DTR/RTS of programming port 70 are left unconnected (i.e. open circuit) which, via pulldown resistor R2, causes the out-put of inverter 75 to be a logic high, thereby keeping diode D1 reverse biased. Consequently, resistor R1 and diode D1 normally do not impede the flow of logic level signals passing from the modem 60 to microcontroller U1.

In accordance with the standard RS-232-C signalling protocol, when an RS-232-C compatible programming terminal is connected to the MIU's programming port 70, it forces the RTS (ready to send) and/or DTR (data terminal ready) ports to a logic high, overriding the normal logic low signal imposed there by pulldown resistor R3. When microcontroller U1 senses that this port is continuously being held to a logic high level, it knows that a programming terminal has been connected. (For an excellent treatise on the EIA industry standard RS-232-C asynchronous communications protocol the reader is again referred to "Technical Aspects of Data Communication", by John E. McNamara, Digital Press, 1977, LCCC number 77-93590.) It is specifically noted that the RS-232-C programming terminal could also be the serial port of a PC, laptop computer or other device capable of emulating the RS-232-C serial communications protocol.

With an RS-232-C programming terminal (not shown) connected to the programming port 70, asynchronous signals sent from microcontroller U1 to be displayed on the programming terminal (to its P-TXD transmit port) are coupled to it through buffering inverter 80. Upon detecting the presence of the programming terminal, microcontroller U1 will instruct modem 60, via commands sent on the CNTL lines, to force the RXD output of the modem 60 to a continuous logic high level. Consequently, asynchronous data signals, corresponding to characters typed on the programming terminal's keyboard (to its P- RXD receive port), will be coupled through inverter 75 and diode D1 and will be readable by microcontroller U1.

In accordance with the earlier discussion, it is observed that the programming terminal connected to the programming port 70 of the MIU is, essentially, in parallel with the input and output of the modem 60. While this conserves I/O (input/output) ports on the microcontroller, it also enables an installer or host station to program the MIU over the normal telephone line via the existing modem 60. This has a distinct advantage in that the programming of the MIU telemtry device can be performed without physically being in close proximity to the MIU telemetry device. Therefore, the MIU can be programmed either by connecting an industry standard RS-232-C terminal to its programming port 70 or by commands sent over the telephone line from a remote host station when the MIU calls in to the host station, or from another source.

MIU telemetry device 34 stores dial-inbound attributes (such as call-in time and the telephone number) for each host station of the plurality of host stations. To accomplish this, a memory lookup table is created in non-volatile memory, U2, which enables the MIU to store, and subsequently retrieve, the dial-inbound attributes for a plurality of host stations under program control of microcontroller U1 or a microprocessor. Table 1 below shows a preferred organization for a lookup table which is capable of storing the dial-inbound attributes for up to four hosts, although this number could be lessened or increased in accordance with the requirements of the particular application.

The dial-inbound attributes for each host include two strings of data containing an appointment time (call-in time) and a corresponding host telephone number, respectively. Since this particular MIU 34 can function with up to four hosts, there are a total of eight character strings of data which need to be stored in non-volatile memory. Four character strings contain call-in time information and the remaining four character strings contain host telephone numbers. Each memory block, labeled E01 through E08 in Table 1 below, contains two pointers, the first pointing to the memory location in memory U2 where the data string begins and the second pointing to the memory location in memory U2 where the same data string ends. Thus, regardless of the actual length of the data strings stored in non-volatile memory U2 of FIG. 3, the structure of the lookup table remains constant since it only contains pointers to other memory locations.

In this implementation, the memory is "fixed partitioned", meaning that each data field has a predetermined starting position in memory and predetermined maximum length. Consequently, the starting address in Table 1 for each data filed is known while the end pointer can vary with the actual length of the data field. Thus, to conserve non-volatile memory, the predetermined start address (a constant) is stored in program ROM 47 while the end address (which is a true variable) is stored in non-volatile memory U2, along with the actual data. Of course, it is possible that both the start and end addresses could be stored in the non-volatile memory; for instance, this would be necessary if the memory space were to be dynamically assigned or if it were desirable to change the fixed partitioning of the memory space without changing the firmware. Although each memory block shown in Table 1 includes a pair of pointers into nonvolatile memory space, it is not a requirement that the pointers be stored in either contiguous memory, or even the same type of memory, so long as the memory arrangement is known in advance.

The lookup table is organized so that two memory blocks are assigned to each host station, thereby providing pointers to the nonvolatile memory locations where the host telephone number and corresponding appointment time (call-in time) will be stored. For host 1, memory block E01 contains the pointers to the memory locations where the host telephone number is stored while memory block E02 contains pointers to the memory locations where the host appointment time is stored. Consequently, memory blocks E01 and E02 contain the pointers for the dial-inbound attributes for the first host station. Similarly, the dial-inbound attribute pointers for host 2 are stored in memory blocks E03 and E04. Finally, as shown in Table 1, the dial-inbound attribute pointers for host 3 are stored in memory blocks E05 and E06 while those for host 4 are stored in memory blocks E07 and E08.

Figure 4:
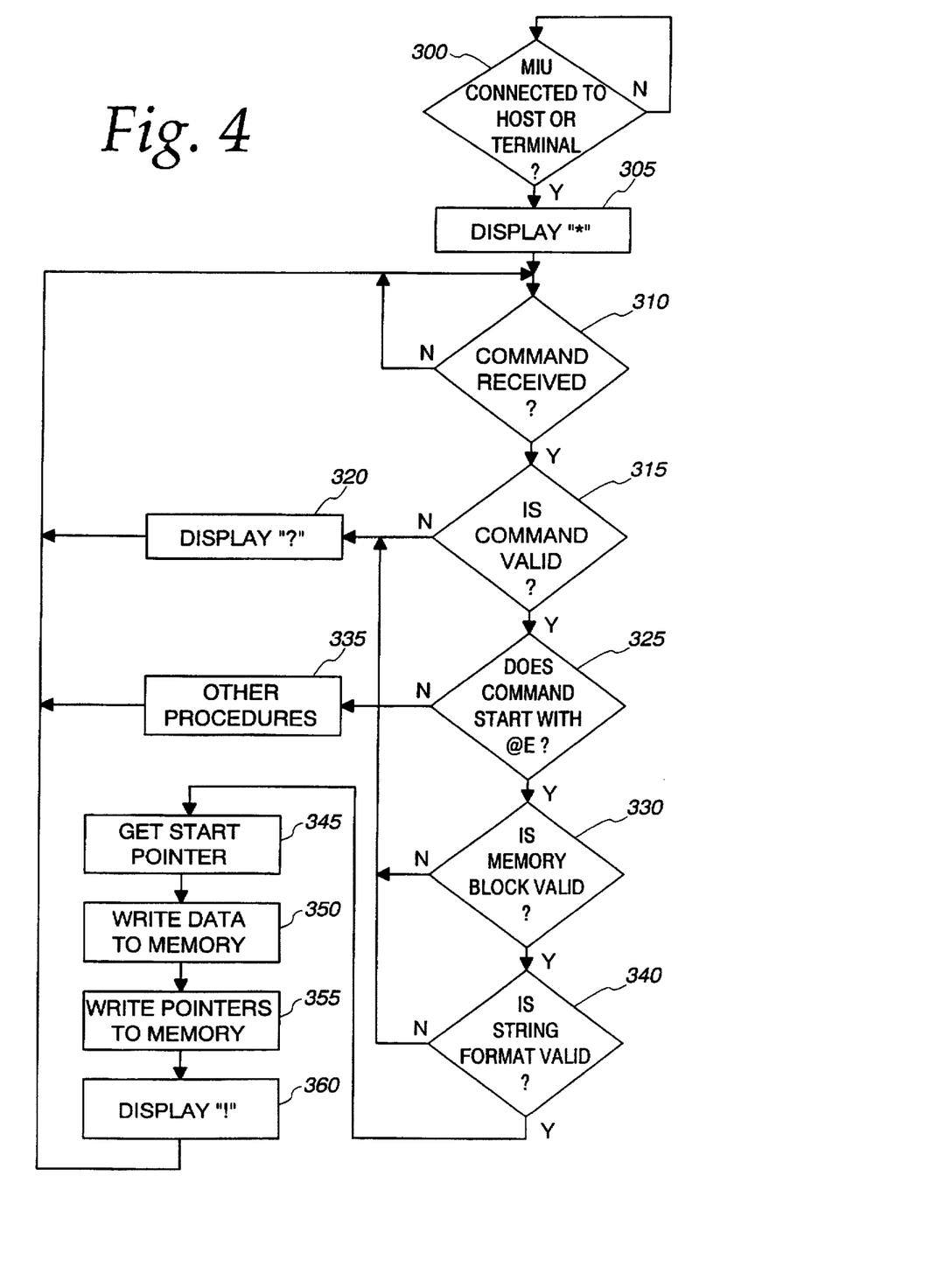
FIG. 4 is a flow chart depicting a programming methodology used to configure the MIU telemetry device with host attributes.

As previously discussed, MIU 34 can be programmed by either connecting an RS-232-C ASCII terminal to its programming port 70 or by commands communicated by a host station and over the telephone line through modem 60 of the MIU. Once connected in this manner, the programmer can enter configuration data such as host attributes and subsequently store such data in non-volatile memory U2. The flow chart shown in FIG. 4 depicts a procedure for programming

TABLE 1

Lookup Table for a Four Host Station Telemetry Device

|  | MEMORY POINTERS |  | MEMORY BLOCK |  |
|---|---|---|---|---|
| HOST 1 Telephone Number String | Start Addr. 1 | End Addr. 1 | E01 | ] HOS |
| HOST 1 Appointment Time String | Start Addr. 2 | End Addr. 2 | E02 |  |
| HOST 2 Telephone Number String | Start Addr. 3 | End Addr. 3 | E03 | ] HOS |
| HOST 2 Appointment Time String | Start Addr. 4 | End Addr. 4 | E04 |  |
| HOST 3 Telephone Number String | Start Addr. 5 | End Addr. 5 | E05 | ] HOS |
| HOST 3 Appointment Time String | Start Addr. 6 | End Addr. 6 | E06 |  |
| HOST 4 Telephone Number String | Start Addr. 7 | End Addr. 7 | E07 | ] HOS |
| HOST 4 Appointment Time String | Start Addr. 8 | End Addr. 8 | E08 |  | the dial-inbound attributes for a plurality of host stations into a multiple host dial-inbound MIU. This procedure is implemented in the program or firmware which is stored in ROM 47 and which controls the operation of the MIU telemetry device.

In the software program outlined in the flowchart of FIG. 4, as per block 300 a determination is made to find out if an RS-232 compatible terminal (or an equivalent PC or laptop computer, not shown) has been connected to programming port 70 or if modem 60 has established a data connection over the telephone line to a host station for remote programming purposes. The MIU is receptive to data communication signals when either condition is true, in which case control will pass to functional block 305 which displays an "*" (asterisk) on the terminal's display, to confirm to the programmer (installer) that the MIU is ready for command input, before passing control to decision block 310 which waits for an input command consisting of a string of characters followed by a carriage return (CR).

In this programming mode, a variety of high level commands may be entered into the MIU either from a terminal at port 70 or via a connected host station. Such commands enable the personality of the MIU telemetry device to be uniquely configured for operation in a specific application. To program or enter the dial inbound attributes, a command which begins with the characters "@E" followed by two numeric digits allows configuration data (host attributes) to be manually entered and stored in the memory blocks depicted in Table 1 above. The @E command indicates that data is going to be put into EEROM U2 at the specified memory block (i.e. @E01, for host 1's telephone number, as shown in Table 1 above). In other words, the @E01 command indicates that the character string following the @E01 command should be placed in memory block E01. The @E02 command indicates that the character string following the @E02 command should be placed in memory block E02, and so forth. The data (character string) following the @E command is either a telephone number or a time stamp (call-in time) in this particular embodiment. For example, to program the dial-inbound attributes for host 1, the following two commands would be entered: "@E01 1234567690" and "@E02 MM/DD/YY HH:MM." This causes the phone number "1234567690" to be stored in memory block E01 and the call-in time "MM/DD/YY HH:MM" to be stored in memory block E02. With this host attribute information stored in nonvolatile memory U2, the MIU would dial host 1 at telephone number 1234567890 on day DD of month MM in the year 19YY at time HH hours, MM minutes.

After a command is entered, control is transferred to derision block 315 which checks for a valid command. If the command entered by the programmer is not recognized, control passes to function block 320 and the telemetry device responds with "?" indicating that the command was not recognized. Control is then returned to derision block 310 for the entry of another command.

After a valid command is entered, control is transferred from derision block 315 to decision block 325 which checks the first two characters entered by the installer. As discussed above, if the command begins with an "@E" then it pertains to the programming of the dial-inbound attributes and control is passed to derision block 330. Otherwise, control is transferred to function block 335 which services all other valid commands. Assuming the entry of an @E command, decision block 330 will retrieve the number of the memory block to be programmed from the input string. This number is contained in the two digit numeric characters following the @E command. For instance, as previously mentioned, @E01 indicates that the first memory block in the non-volatile memory is to be programmed with the data appended to the command. If the memory block is invalid, control is returned function block 320, which causes a "?" to be displayed, before returning control to derision block 310 for the re-entry of the correct data.

Assuming the memory block is found to be valid, control is transferred to derision block 340 which checks the remaining characters in the input string for proper format. Since the data following an @E command is either a telephone number or a time stamp in this particular embodiment, the data in the remaining string must be numeric for phone numbers and in the designated time-date (MM/DD/YY HH:MM) format for the time stamp. It is noted that for reasons which will become apparent later, it is acceptable to program a zero value for one or both dial-inbound host attributes. If the command argument is invalid, control is transferred first to function block 320 and then to derision block 310, thereby displaying a "?" while waiting for the command to be re-entered. Otherwise, control is transferred to function block 345.

Function block 345 retrieves the starting pointer for the designated memory block in preparation for the writing of data at a first starting location in nonvolatile memory U2. Recalling that the organization of non-volatile memory U2 is fixed partitioned, as previously discussed, this starting memory pointer is retrieved from program ROM 47 and copied into RAM 45. Control then passes to function block 350 which causes the host attributes (data) to be written into non-volatile memory U2. As each character in the string is written into contiguous memory, the value of the RAM start pointer is incremented by one. Consequently, when the entire data string has been written into non-volatile memory U2, the pointer to the end address for the string data field is known.

Finally, control passes to function block 355 which completes the storage procedure by writing the value of the end pointer (for the just stored data string) into the lookup table shown in Table 1 above. Consequently, both the host attribute data string and end pointer have been written into non-volatile memory, completing the storage procedure for the given memory block. With this data safely stored in memory U2, control then passes to function block 360 which causes an "!" to be displayed, thereby confirming the success of the host attribute programming procedure. Next, control is returned to decision block 310 for the envy of the next command.

Using the manual host attribute programming procedure just described, it is possible for the MIU to retain the programmable dial-inbound host attributes for a plurality of host stations in a lookup table for subsequent use. Unfortunately, this manual process is time consuming and subject to error by the installer. Thus, it is desirable to adopt a methodology for programming the MIU which only requires the installer to perform a minimum number of steps to initialize the MIU for operation in its target multiple host AMR system. In this manner, installer error is minimized.

Therefore, the preferred method of programming the MIU telemetry device depicted in FIG. 3 is by having the installer enter only a minimal number of parameters, including the telephone number for a master host, and let the MIU telemetry device call into the master host and be remotely programmed with host attributes from the master host over the telephone line. The master host uses all the same @E commands to program respective the dial-inbound attributes for each of the hosts, except that the procedure is fully automatic.

Referring once again to FIG. 4 and recalling the discussion pertaining to blocks 325 and 335, it was shown that the MIU is receptive to commands other than the @E commands, used to write the values of various dial-inbound parameters to the non-volatile EEROM. For instance, an @D command is used to set the date on real time clock U3 while the @T command sets its time. Entering the command "PRO" causes the MIU to prompt the installer for several basic parameters, including a phone number for host 1. When these parameters have been entered, entering the command "GO 1" will cause the MIU to call that phone number and be remotely programmed by the master host. As noted before, the programming host (master host) uses the same @E commands as the manual procedure previously described. As a result, the MIU can be completely programmed and configured by a remote programming host which has access to a system-wide database of MIU parameters.

In summary, based upon the discussion thus far, a methodology has been discussed for programming an MIU telemetry device which is capable of retaining dial-inbound attributes for a plurality of hosts. A method whereby these attributes can be entered and permanently retained in memory of the MIU telemetry device has been disclosed. With these application specific host attributes entered into a lookup table, it is now possible to discuss how the MIU telemetry device operates in a multiple host station environment.

Referring again to Table 1, a plurality of dial-inbound attributes are retained in a memory lookup table. For the four host lookup table shown, memory blocks E02, E04, E06 and E08 contain pointers to the memory locations in non-volatile memory U2 which store the scheduled appointment times for hosts 1, 2, 3 and 4, respectively. Under program control, microcontroller U1 periodically scans through this table and ascertains when a specific appointment time (call-in time) has become history; that is, when the target date and time has become history with respect to the current date-time kept by real time clock U3. When an appointment time becomes due, microcontroller U1 will then look up the corresponding host station's telephone number, subsequently using that number to dial into that host for a telemetry transaction. Memory blocks E01, E03, E05 and E07 contain the pointers to the memory locations which store the telephone numbers for hosts 1, 2, 3 and 4, respectively.

Figure 5:
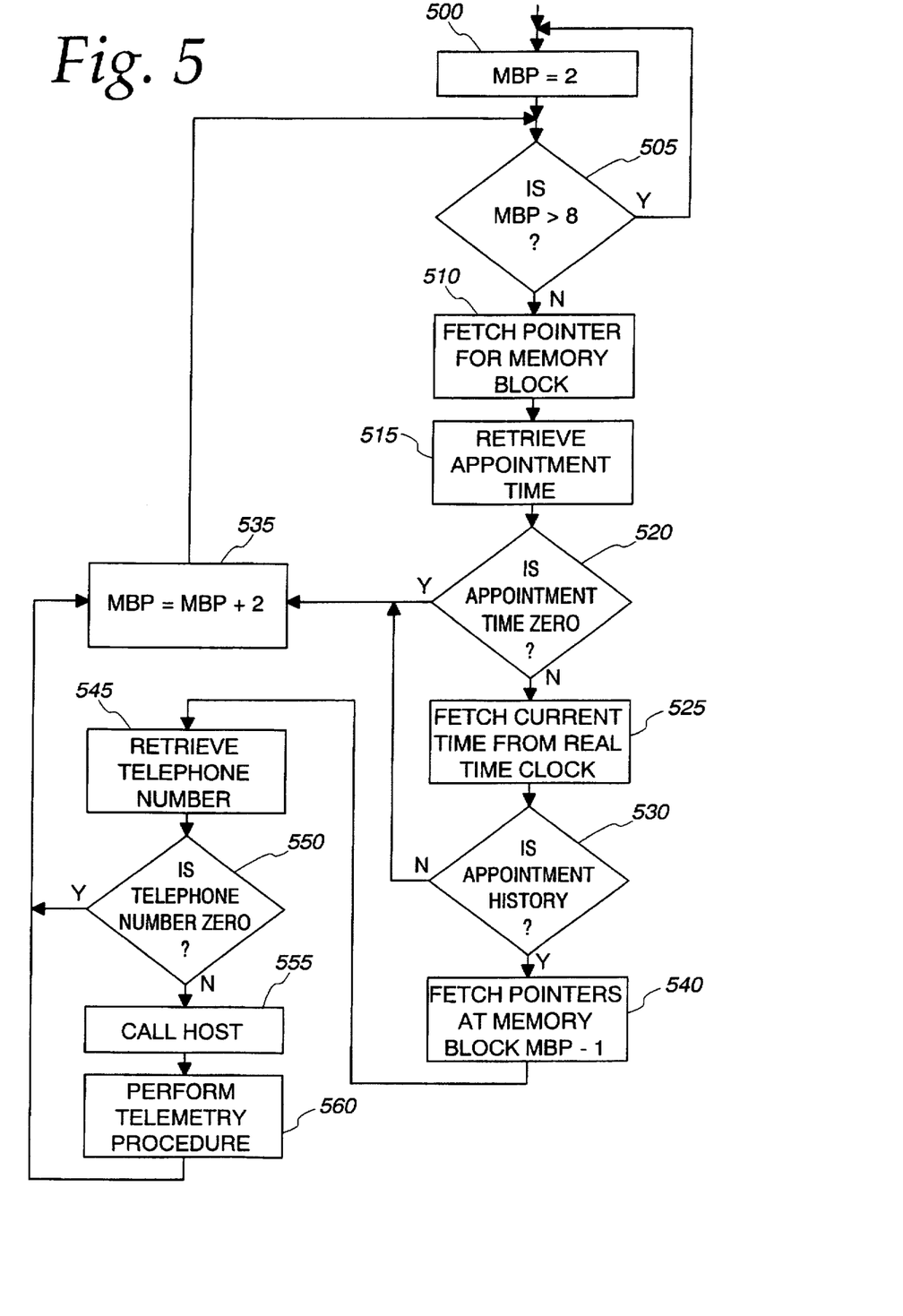
FIG. 5 is a flow chart depicting the operational flow of the disclosed multiple host telemetry device.

FIG. 5 shows a flow chart depicting the operating methodology for a multiple host MIU telemetry device 34 in more detail. This methodology of this flow chart is incorporated in software of ROM 47 which controls the operation of microcontroller U1 and telemetry device 34. Referring now to the flow chart of FIG. 5, process flow begins with the initialization of a variable MBP (memory block pointer) to the value of two, in function block 500. As previously described, pointers to the dial-inbound host attributes for a plurality of hosts are retained in the memory blocks of a lookup table. Recalling Table 1, the pointers for the host appointment times are stored in memory blocks E02, E04, E06 and E08 for hosts 1, 2, 3, and 4, respectively. That is, beginning at memory block E02 and moving in increments of two memory blocks, the pointers for each host's appointment time can be retrieved from the lookup table. Thus, the initialization of the variable MBP to the numeric value 2 points it to the memory block E02, hence to the memory locations where the first host's appointment time is stored. Control then passes to derision block 505 which is the beginning of a process loop which checks to see if the value of the variable MBP is greater than 8.

Since the MBP variable has been just initialized to the numeric value two, control is transferred to function block 510 which fetches the memory pointers at memory block MBP from the lookup table. Since MBP is equal to two, the pointers in memory block E02 reference the location in nonvolatile memory U2 where the first host's (host 1's) appointment time is stored. Control then passes to function block 515 which retrieves this appointment time before passing control to decision block 520 which looks for a zero value appointment time. The significance of a zero value appointment time will be explained shortly, but for the moment the appointment time is assumed to be a valid and, therefore, non-zero. Consequently, control transfers first to function block 525, which fetches the current time from the MIU's real time clock, and then to decision block 530, which compares the current time to the host's appointment time. Assuming that the host appointment time has not passed (i.e. it is not history with respect to the current time), control is transferred to function block 535 where the value of the memory block pointer MBP is incremented by two. Control is then returned to decision block 505.

With MBP now equal to the numeric value four, the pointers in memory block E04 reference the location in memory where the second host's (host 2's) appointment time is stored. Assuming, for the moment, that no host appointment time is due, the loop just described through flow chart blocks 505, 510, 515, 520, 525, 530 and 535 will repeat. When control returns to decision block 505, the value of MBP will be six and the appointment time for host 2 will have been checked. Next, the loop will repeat again this time checking the appointment time for host 3, under pointers contained in memory block E06. The value of MBP will now be 8 and the loop will repeat again, checking the appointment time for host 4 contained in memory block E08, as control is again returned to derision block 505.

In accordance with the just described multiple host MIU operating procedure relating to the flow chart shown in FIG. 5, all four host appointment times have been checked by sequentially scanning through the lookup table and checking each host's appointment time against the current time. After the appointment time for host 4 has been checked, the value of MBP will be ten causing decision block 505 to transfer control back to function block 500 which re-initializes the MBP to numeric value two, thereby beginning the entire scanning process again, beginning at the appointment time for host 1, stored in memory block E02 in the lookup table. Assuming no changes in the prior conditions, this scanning process will repeat indefinitely.

It is not a strict requirement that an MIU capable of operating in a multiple host environment use all of its multiple host capability. For instance, although the telemetry device described can accommodate up to four hosts, it can also operate with any lesser number of hosts. In this case, the unused appointment times for the unused hosts are programmed with zeros, an invalid appointment time. In the process loop just described, when a zero valued appointment time is detected, derision block 520 will result in control being transferred to function block 535, thereby incrementing the MBP by two and effectively bypassing an empty entry in the host lookup table.

Of course, in practice, an appointment time will eventually become history. When this happens decision block 530 will transfer control away from the scan loop to functional block 540 which will fetch the pointers from memory block MBP-1, corresponding to the memory locations where that host's telephone number is stored. Control next passes to functional block 545, which retrieves the telephone number for the host whose appointment time has arrived, before passing control to derision block 550 which checks for a zero value, an invalid telephone number.

As previously mentioned, it is permissible to program any dial-inbound attribute to a zero value. The intention is to effectively remove such a host from the lookup table if either attribute is set to zero. Consequently, if decision block 550 determines that a host telephone number is zero, control will be transferred to function block 535 which will increment the value of MBP by two, effectively bypassing the zero table entry for that host and moving on to the next memory block, corresponding to the next host in the table. Assuming the telephone number is valid, control will be passed to function block 555 thereby causing the MIU to dial the corresponding host's telephone number to establish a data connection with the host.

Control next passes to function block 560 wherein the host opens a meter port on the MIU and interrogates its utility meter in the ensuing telemetry session. Although the MIU has a plurality of meter ports, each host station is only provided with the specific commands which will enable that host to read a specific meter port or ports. Consequently, in one embodiment, a particular host is limited to reading only those meters (meter ports) which it has been specifically authorized to access because of the fact that the particular host is not equipped with the command codes needed to read other meter ports. For example, as discussed below, host 1 could be provided with the specific commands which enable it to instruct the MIU to read meter port M1, but not the other ports. Also for example, host 2 could be provided with the specific command to enable it to instruct the MIU to read meter port M2 and meter port M3. When the telemetry transaction between the MIU telemetry device and a particular host station is completed, control is passed to function block 535 which again increase the value of MBP by two, thereby moving on to check the appointment time for the next host in the lookup table.

With respect to the interrogation of the utility meter, as part of the initial configuring of the MIU telemetry device, the MIU telemetry device knows, via configuration data stored in its nonvolatile memory as part of its programming, the type of utility meter attached to each active meter port. Consequently, the MIU is able to electronically interrogate each utility meter so as to retrieve the reading shown on the meter's register. Via a high level command, similar to the "@E", "@D", "@T" commands previously described, the host instructs the MIU to read a specific meter port and the MIU will automatically select the appropriate serial communication protocol for the selected meter, interrogate that meter, and upload the readings as telemetry data to the on-line host.

For example, to read meter port M1, the host would send the command @M01 which would cause the MIU to read the designated meter port, namely meter port M1. As indicated earlier, the host would only be provided with the commands to read certain meter ports thereby enabling it to read its own utility meter, or meters, but not those of another utility company. In this example, host 1 would be provided with the @M01 command so that it could instruct the MIU to read information from the M1 meter port. However, in this example, host 1 would not be provided with the @M02, @M03 and @M04 commands and thus host 1 would not be able to cause reading from meter ports M2, M3 and M4.

To further illustrate, in another example host 2 can be provided with the @M02 and @M03 commands. In this manner, host 2 can cause the MIU to take readings of information from meter ports M2 and M3, but not meter ports M1 and M4.

As part of the normal telemetry transaction procedures performed in functional block 560, a connected host station can reprogram any of the dial-inbound attributes using the same methods previously described for the "@E" command. Since the dial-inbound MIU calls only calls into a host station when its appointment time has expired, it is a normal part of the telemetry transaction for the host to, at least, update the appointment time. However, in practice, the host can modify or update any of the dial-inbound parameters while the telemetry device is on-line. Consequently, for a multiple host telemetry device, each host can at least modify or update its own dial-inbound parameters and could, if desired, modify other dial-inbound parameters.

In addition, the procedures carried out in functional blocks 555 and 560 include methods to avoid busy telephone numbers and methods which allow the MIU to call back if it cannot establish a data connection with the host within a given period of time. A more detailed description of how a dial-inbound MIU is activated is contained in a flow chart and discussion pertaining to FIG. 6 in my co-pending patent application entitled "METHOD AND APPARATUS FOR THE ON-DEMAND ACTIVATION OF TELEPHONE LINE TELEMETRY DEVICES", (Docket No. F95-K-005, filed concurrently herewith.)

It should be noted that automatic meter reading systems represent only one application where telephone line telemetry devices and techniques are utilized. Those skilled in the art will appreciate that these same methods are equally suitable for use in a broad and diverse range of applications which employ remote monitoring techniques and devices. A partial list of other applications would include copy and vending machine monitors, industrial monitoring of remote processes (for instance, oil field flow systems) and remote monitoring of diesel generators or like industrial equipment. While the particular term, meter port, has been used herein, it should be understood that this term also includes other ports where consumption information is gathered or transferred.

It is emphasized that in one embodiment, each of the plurality of host stations to which the multiple host MIU communicates are independent host stations in that each host station has its own telephone number and its own appointment time independent of the other host stations. This is to be distinguished from the case of a conventional single host MIU which employs a backup telephone number which is only dialed in the event that the host does not answer at the first telephone number the MIU dials. It is noted that the second telephone number is not dialed if the MIU is successful with the host at the first telephone number.

It is further noted that in one alternative embodiment, the multiple host telemetry device taught herein is combined with the data activation technique and telemetry device taught in my copending patent application entitled "APPARATUS AND METHOD FOR ON-DEMAND ACTIVATION OF TELEPHONE LINE TELEMETRY DEVICES", (Docket No. P95-K-005). This combined alternative embodiment of the telemetry device is now described in more detail. Recalling that a dial-inbound telemetry device calls into a host on appointment, the device is inaccessible to the host except at those times when it calls into the host. To overcome this limitation, conventional devices incorporate various methods to make them on-demand activatable. One technique for providing this on-demand capability involves ringing the subscriber telephone line a specified number of times. Still another technique requires that someone or something (e.g. an answering machine, FAX, etc.) answer the ringing telephone line whereafter an activating tone signal will be sent. Depending upon the methodology used, in response to receiving the specified number of rings or upon reception of the activating tone signal, the telemetry device will, in the first case, call back to the host, and, in the second case, will immediately go off-hook to engage in a telemetry transaction with the on-line host which activated it. It is noted that these telemetry devices were single host telemetry devices.

Being single host architectures, these conventional telemetry devices would only be activated by a single host. Conversely, as discussed in my copending patent application "APPARATUS AND METHOD FOR ON-DEMAND ACTIVATION OF TELEPHONE LINE TELEMETRY DEVICES" (DOCKET NO. P95-K-005), the multiple host telemetry device could be on-demand activated by any one of a plurality of hosts. Consequently, both the tone activation and the ring counting methodologies, which lack any data capability, could not transfer information about which host was attempting to on-demand activate the telemetry device. Applying this conventional on-demand activation methodology to the multiple host telemetry device could only result in the telemetry device calling into all hosts (or following some other prearranged, i.e. fixed, activation scenario), since it could not know which host had on-demand activated it. It is undesirable for the telemetry device to call all of the plurality of hosts in the event when only one host has initiated an on-demand activation. A solution to this problem is described in my copending patent application "APPARATUS AND METHOD FOR ON-DEMAND ACTIVATION OP TELEPHONE LINE TELEMETRY DEVICES" (DOCKET NO. P95-K-005) which discloses a data activation technique that permits the activating host to transfer data to the telemetry device which will enable the telemetry device to configure its response to the data activation signal based upon the data received therein.

The data activating signal from a host includes information which enables the telemetry device to ascertain which particular host (i.e. host 1, host 2, host 3, etc.) has on-demand activated it. The multiple host telemetry device can then call into the particular host which activated it. For the AMR system depicted in FIG. 2A, any one of the utility company hosts could on-demand activate the multiple host MIU, using the data activation methodology described in my copending patent application (DOCKET NO. P95-K-005.) The reception of the data activating signal would result in the MIU calling the corresponding host, since the data activation signal identities the particular activating host. This would cause the MIU to over-ride the appointment time dial-inbound attribute and call into the host on-demand. In more detail, the reception of a data activating signal which corresponds to a particular host causes the MIU to access the host attribute (call-in telephone number) which corresponds to the particular host. Using the accessed attribute, namely the call-in telephone number, the MIU then dials into the particular host. Referring to the flow chart show in FIG. 5, the reception of such an on-demand data activating signal would cause the value of the MBP (memory block pointer) to be initialized to a value corresponding to the host which activated it (i.e. MBP=2 for host 1, MBP=4 for host 2, etc.) with process flow beginning at function block 540.

While a multiple host telemetry device apparatus is described above, it is noted that a method of operating this telemetry device is also disclosed. More particularly, a method for collecting information by a multiple host telemetry device at a remote location is disclosed. The telemetry device transmits collected information over a phone line to one of a plurality of host stations. The telemetry device includes at least one meter port. The method of operating the multiple host telemetry device includes the step of storing in a memory in the telemetry device respective host attributes for each of the plurality of host stations. The method also includes the step of accessing by a processor in the telemetry device the host attributes in the memory thus providing accessed host attributes. The method further includes the step of determining from the accessed host attributes which host station of the plurality of host stations to call over the phone line to report information from the at least one meter port.

While only certain preferred features of the invention have been shown by way of illustration, many modifications and changes will occur to those skilled in the art. For example, while a multiple port MIU telemetry device embodiment is depicted and described, a multiple host telemetry device is not required to have multiple ports. Although one embodiment of the multiple host telemetry device includes a plurality of meters, each associated with a corresponding host, an MIU telemetry device with a single meter port is still capable of operating in a multiple host environment. For instance, an MIU telemetry device with only a single meter port can call into different hosts so as to make the consumption information available to different hosts for entirely different reasons. In keeping with its multiple host design, the MIU can have an independent appointment time with each host at a corresponding host telephone number. For example, a single port MIU connected to a water meter could be programmed to call the water company monthly (assuming a monthly billing cycle) and can also have a weekly appointment with a second host (e.g. a county water management center) to facilitate closer monitoring of water resource usage. It is, therefore, to be understood that the present claims are intended to cover all such modifications and changes which fall within the true spirit of the invention.

What is claim is:

1. A telemetry device for collecting information at a remote location and transmitting the information over a phone line to one of a plurality of host stations, the telemetry device comprising:
   at least one meter port for receiving information;
   a memory for storing respective host attributes for each of the plurality of host stations; and
   a processor, coupled to the memory and at least one meter port, for accessing the host attributes in the memory to determine which host station of the plurality of host stations to call over the phone line to report information from the at least one meter port.

2. The telemetry device of claim 1 wherein the host attributes in the memory include a plurality of host station call-in times which indicate when the telemetry device should call in to each host station, respectively, to report information.

3. The telemetry device of claim 1 wherein the host attributes in the memory include a plurality of host station telephone numbers which correspond to the plurality of host stations, respectively.

4. The telemetry device of claim 1 wherein the host attributes in memory include a plurality of host station call-in times and a respective plurality of host station telephone numbers.

5. The telemetry device of claim 4 wherein the processor accesses the host attribute information in memory to determine a host call-in time and a respective host station telephone number.

6. The telemetry device of claim 1 wherein the processor accesses the host attributes in the memory to determine a particular time to call a host station.

7. The telemetry device of claim 1 wherein the processor accesses the host attribute information in memory to determine a particular host station telephone number to call to connect the telemetry device to a particular host station.

8. The telemetry device of claim 1 further comprising a programming port coupled to the processor for providing host attribute information to the telemetry device.

9. The telemetry device of claim 1 further comprising a telephone line input for receiving host attribute information from a host station over the phone line.

10. The telemetry device of claim 2 further comprising a real time clock coupled to the processor for activating the telemetry device to call in to a particular host station upon the occurrence of the respective call-in time for that host station.

11. A telemetry device for collecting information at a remote location and transmitting the information over a phone line to one of a plurality of host stations, the telemetry device comprising:

a plurality of meter ports for receiving information;

a memory for storing respective host attributes for each of the plurality of host stations; and a processor, coupled to the memory and the plurality of meter ports, for accessing the host attributes in the memory to determine which host station of the plurality of host stations to call over the phone line to report information from a meter port.

12. The telemetry device of claim 11 wherein the host attributes in the memory include a plurality of host station call-in times which indicate when the telemetry device should call in to each host station, respectively, to report information.

13. The telemetry device of claim 11 wherein the host attributes in the memory include a plurality of host station telephone numbers which correspond to the plurality of host stations, respectively.

14. The telemetry device of claim 11 wherein the host attributes in the memory include a plurality of host station call-in times and a respective plurality of host station telephone numbers.

15. The telemetry device of claim 14 wherein the processor accesses the host attribute information in memory to determine a host call-in time and a respective host station telephone number.

16. The telemetry device of claim 11 wherein the processor accesses the host attributes in the memory to determine a particular time to call a host station.

17. The telemetry device of claim 11 wherein the processor accesses the host attribute information in memory to determine a particular host station telephone number to call to connect to a particular host station.

18. The telemetry device of claim 11 further comprising a programming port coupled to the processor for providing host attribute information to the telemetry device.

19. The telemetry device of claim 11 further comprising a telephone line input for receiving host attribute information from a host station over the phone line.

20. The telemetry device of claim 12 further comprising a real time clock coupled to the processor for activating the telemetry device to call in to a particular host station upon the occurrence of the respective call-in time for that host station.

21. A telemetry device for collecting information at a remote location and transmitting the information over a phone line to one of a plurality of host stations in an on-demand basis, the telemetry device comprising:

at least one meter port for receiving information;

a memory for storing respective host attributes for each of the plurality of host stations, the host attributes including a respective telephone number for each of the host stations;

a receiver for receiving a data activating signal transmitted over the phone line to the telemetry device, the data activating signal designating one of a plurality of host stations as a designated host station which the telemetry device should call to engage in an on-demand telemetry transaction;

a processor, coupled to the receiver, to the memory and to the at least one meter port, for accessing the host attributes in the memory to determine the telephone number of the designated host station indicated by the data activating signal, the processor initiating a telemetry transaction with the designated host station over the phone line to report information from the at least one meter port; and a transmitter, coupled to the processor, for transmitting the information over the phone line to the designated host station.

22. A method for collecting information by a telemetry device at a remote location and transmitting the information over a phone line to one of a plurality of host stations, the telemetry device including at least one meter port, the method comprising the steps of:

storing in a memory in the telemetry device respective host attributes for each of the plurality of host stations;

accessing by a processor in the telemetry device the host attributes in the memory thus providing accessed host attributes;

determining from the accessed host attributes which host station of the plurality of host stations to call over the phone line to report information from the at least one meter port.

23. The method of claim 22 wherein the host attributes in the memory include a plurality of host station call-in times which indicate when the telemetry device should call in to each host station, respectively, to report information.

24. The method of claim 22 wherein the host attributes in the memory include a plurality of host station telephone number corresponding to the plurality of host stations, respectively.

25. The method of claim 22 wherein the host attributes in the memory include a plurality of host station call-in times and respective telephone numbers corresponding to the plurality of host stations.

26. The method of claim 23 wherein the telemetry device includes a real time clock, the real time clock monitoring the plurality of host station call-in times to determine when a particular host station call-in time has been reached.

27. The method of claim 23 further comprising the step of transmitting over the phone line, by the telemetry device, information from a meter port to the host station whose call-in time has been reached.

28. The method of claim 23 further comprising the step of dialing, by the telemetry device, a host station whose call-in time has been reached to establish a connection therewith over the phone line, such host station being referred to as the connected host station.

29. The method of claim 28 further comprising the step of the connected host station transmitting a command code which designates one of the at least one meter ports as the designated meter port.

30. The method of claim 29 further comprising the step of reading by the telemetry device of information from the designated meter port.

31. The method of claim 30 further comprising the step of transmitting over the phone line, by the telemetry device, information from the designated meter port to the connected host station.

32. The method of claim 22 wherein the telemetry device includes a programming port, the method further comprising the step of inputting host attribute information to the programming port to provide host attribute information to the telemetry device.

33. The method of claim 22 wherein the telemetry device includes a telephone line input, the method further comprising the step of receiving host attribute information from a host station over the phone line.

34. A method for collecting information by a telemetry device at a remote location and transmitting the information over a phone line to one of a plurality of host stations, the telemetry device including a plurality of meter ports, the method comprising the steps of:

storing host attribute information in a memory in the telemetry device, the host attribute information inducting a plurality of respective call-in times for the plurality of host stations and corresponding respective phone numbers for the plurality of host stations;

determining, by the telemetry device, when a particular host call-in time has been reached;

dialing, by the telemetry device, the phone number corresponding to the particular host whose call-in time has been reached to establish a connection between the particular host station and the telemetry device;

initiating a telemetry transaction between the particular host station and the telemetry device;

receiving command codes from the particular host station by the telemetry device, the command codes designating a particular meter port as the designated meter port;

reading information from the designated meter port by the telemetry device; and transmitting, by the telemetry device, information to the particular host station.

35. The method of claim 34 wherein the telemetry device includes a programming port, the method further comprising the step of inputting host attribute information to the programming port to provide host attribute information to the telemetry device.

36. The method of claim 34 wherein the telemetry transaction includes receiving host attribute information from the particular host station over the phone line.

* * * * *